United States Patent
Romagnoli

(10) Patent No.: US 10,328,560 B2
(45) Date of Patent: Jun. 25, 2019

(54) MULTI-MODE DRIVE MECHANISMS AND TOOLS INCORPORATING THE SAME

(71) Applicant: Brian Romagnoli, Swedesboro, NJ (US)

(72) Inventor: Brian Romagnoli, Swedesboro, NJ (US)

(*) Notice: Subject to any disclaimer, the term of this patent is extended or adjusted under 35 U.S.C. 154(b) by 531 days.

(21) Appl. No.: 15/050,844

(22) Filed: Feb. 23, 2016

(65) Prior Publication Data

US 2016/0243689 A1 Aug. 25, 2016

Related U.S. Application Data

(60) Provisional application No. 62/119,367, filed on Feb. 23, 2015.

(51) Int. Cl.
*B25D 16/00* (2006.01)
*B25B 21/02* (2006.01)
(Continued)

(52) U.S. Cl.
CPC ............ *B25D 16/006* (2013.01); *B23B 47/34* (2013.01); *B23B 51/08* (2013.01); *B23D 47/12* (2013.01);
(Continued)

(58) Field of Classification Search
CPC ....... B25D 16/006; B23B 47/34; B23B 51/08; B23B 2260/004; B23B 2260/02; B23D 47/12; B23D 51/16; B23D 77/00
(Continued)

(56) References Cited

U.S. PATENT DOCUMENTS 1,871,020 A 8/1932 Wyzenbeek
2,154,695 A 4/1939 Phelps
(Continued)

FOREIGN PATENT DOCUMENTS

GB 474540 12/1937

OTHER PUBLICATIONS

Shimadzu Seisakusho Ltd., "NCKU-E02 Multiple-turn Cylindrical Cam Mechanism", http://acmcf.me.ncku.tw/model/page/model/ncku/E02.htm (Dec. 17, 2014).
(Continued)

*Primary Examiner* — Alexander M Valvis
*Assistant Examiner* — Lucas E. A. Palmer
(74) *Attorney, Agent, or Firm* — FisherBroyles, LLP

(57) ABSTRACT

The present invention provides a multi-mode drive mechanism. The multi-mode drive mechanism may be employed, for example, in a power tool, for driving a chuck supporting an end effector, such as a drill bit or spiral cut bit, for acting on a work surface. For example, when employed in a power tool, the mechanism can generate rotating, reciprocating, or simultaneous rotating and reciprocating motion. Cutting with simultaneous rotational and reciprocating motion lessens the potential for undesired walking or wandering of the cutting bit by actively removing debris from the cut. Additionally, multi-mode drive mechanisms provide increased functionality in a single tool to accommodate a variety of situations and materials. One aspect of the invention provides a multi-mode drive mechanism including: an input shaft, a reciprocating assembly, an output shaft, a reciprocating block, and a shift collar. The input shaft terminates in an input external spur gear.

21 Claims, 17 Drawing Sheets

(51) Int. Cl.
*B23D 47/12* (2006.01)
*B23D 51/16* (2006.01)
*B23B 47/34* (2006.01)
*B23B 51/08* (2006.01)
*B23D 77/00* (2006.01)

(52) U.S. Cl.
CPC ............ *B23D 51/16* (2013.01); *B23D 77/00* (2013.01); *B23B 2260/004* (2013.01); *B23B 2260/02* (2013.01)

(58) Field of Classification Search
USPC .............................................. 173/47, 48, 17
See application file for complete search history.

(56) References Cited

U.S. PATENT DOCUMENTS

| | | | | |
|---|---|---|---|---|
| 2,548,411 | A | 4/1951 | Vache | |
| 2,723,688 | A | 11/1955 | Conover | |
| 2,816,583 | A | 12/1957 | Hill | |
| 2,858,701 | A | 11/1958 | Willcox | |
| 3,049,803 | A | 8/1962 | Danger | |
| 3,388,728 | A | 6/1968 | Riley, Jr. | |
| 3,449,967 | A | 6/1969 | Dancsik | |
| 3,596,525 | A | 8/1971 | Niesz | |
| 3,807,242 | A | 4/1974 | Stone | |
| 3,876,015 | A | 4/1975 | Kivela | |
| 4,098,351 | A * | 7/1978 | Alessio | B25D 11/005 173/104 |
| 4,111,060 | A | 9/1978 | Nerini | |
| 4,158,313 | A | 6/1979 | Smith | |
| 4,233,850 | A | 11/1980 | Edwardson | |
| 4,271,710 | A | 6/1981 | Brems | |
| 4,456,076 | A | 6/1984 | Schmid | |
| 4,712,625 | A | 12/1987 | Kress | |
| 4,901,588 | A | 2/1990 | Zudal | |
| 4,972,589 | A | 11/1990 | Povleski | |
| 5,020,606 | A * | 6/1991 | Odor | B23C 1/20 173/216 |
| 5,036,925 | A * | 8/1991 | Wache | B25D 11/005 173/104 |
| 5,052,497 | A | 10/1991 | Houben | |
| 5,056,607 | A | 10/1991 | Sanders | |
| 5,212,995 | A | 5/1993 | Robinson | |
| 5,316,415 | A | 5/1994 | Chiu | |
| 5,363,711 | A | 11/1994 | Seto | |
| 5,427,188 | A | 6/1995 | Fisher | |
| 5,511,912 | A | 4/1996 | Ellerbrock | |
| 5,566,768 | A | 10/1996 | Bourke | |
| 5,595,250 | A | 1/1997 | Bourke | |
| 5,607,265 | A | 3/1997 | Lane | |
| 5,609,603 | A | 3/1997 | Linden | |
| 5,664,634 | A * | 9/1997 | McCracken | B24B 23/00 15/22.1 |
| 5,706,902 | A * | 1/1998 | Eisenhardt | B25B 21/02 173/211 |
| 5,755,293 | A | 5/1998 | Bourke | |
| 5,769,172 | A * | 6/1998 | Sher | A61B 17/320758 173/111 |
| 5,924,209 | A | 7/1999 | Ward | |
| 5,957,765 | A | 9/1999 | Kimbel | |
| 6,176,321 | B1 | 1/2001 | Arakawa | |
| 6,192,996 | B1 * | 2/2001 | Sakaguchi | B25B 16/00 173/109 |
| 6,213,222 | B1 * | 4/2001 | Banach | B25D 16/00 173/1 |
| 6,264,211 | B1 | 7/2001 | Granado | |
| 6,269,888 | B1 | 8/2001 | Schuda | |
| 6,315,060 | B1 * | 11/2001 | Schuda | B23Q 5/027 173/115 |
| 6,443,675 | B1 | 9/2002 | Kopras | |
| 6,460,627 | B1 * | 10/2002 | Below | B25D 16/006 173/109 |
| 6,651,348 | B1 | 11/2003 | Steinmann | |
| 6,712,156 | B2 | 3/2004 | Funfer | |
| 6,751,875 | B2 | 6/2004 | Jones | |
| 6,755,424 | B1 | 6/2004 | Paulsen | |
| 6,796,921 | B1 * | 9/2004 | Buck | B25F 5/001 173/47 |
| 7,134,508 | B2 | 11/2006 | Prell | |
| 7,165,920 | B2 | 1/2007 | Baber | |
| 7,314,097 | B2 | 1/2008 | Jenner | |
| 7,469,752 | B2 | 12/2008 | Furusawa | |
| 7,635,032 | B2 * | 12/2009 | Saur | B25D 16/006 173/109 |
| 7,753,135 | B2 | 7/2010 | Lennartz | |
| 7,895,909 | B2 | 3/2011 | Hartmann | |
| 7,946,318 | B2 | 5/2011 | Carroll | |
| 7,987,920 | B2 | 8/2011 | Schroeder | |
| 8,011,442 | B2 | 9/2011 | Lennartz | |
| 8,092,125 | B2 * | 1/2012 | Carr | B23Q 5/265 173/168 |
| 8,109,343 | B2 | 2/2012 | Schroeder | |
| 8,251,158 | B2 | 8/2012 | Tomayko | |
| 8,307,912 | B2 | 11/2012 | Fisher | |
| 8,602,411 | B2 | 12/2013 | Ramseier | |
| 8,622,401 | B2 | 1/2014 | Puzio | |
| 8,789,283 | B2 * | 7/2014 | Sinur | B23D 51/16 173/114 |
| 9,266,228 | B2 * | 2/2016 | Hecht | B25D 11/062 |
| 9,415,498 | B2 * | 8/2016 | Hecht | B25D 11/062 |
| 9,827,660 | B2 * | 11/2017 | Blum | B25D 16/006 |
| 9,849,574 | B2 * | 12/2017 | Hecht | B25D 16/006 |
| 2001/0034942 | A1 * | 11/2001 | Marinkovich | B23D 51/16 30/393 |
| 2002/0134563 | A1 * | 9/2002 | Stirm | B25D 16/00 173/201 |
| 2002/0134811 | A1 | 9/2002 | Napier | |
| 2003/0173097 | A1 * | 9/2003 | Holzer | B25D 16/003 173/178 |
| 2004/0117993 | A1 | 6/2004 | Armstrong | |
| 2006/0086514 | A1 * | 4/2006 | Aeberhard | B25B 21/00 173/48 |
| 2006/0207776 | A1 * | 9/2006 | Hahn | B25D 11/104 173/49 |
| 2006/0213675 | A1 | 9/2006 | Whitmire | |
| 2006/0237205 | A1 * | 10/2006 | Sia | B25B 21/00 173/48 |
| 2006/0266139 | A1 | 11/2006 | Neumann | |
| 2007/0084614 | A1 | 4/2007 | Whitmire | |
| 2007/0102174 | A1 * | 5/2007 | Duesselberg | B25D 16/006 173/48 |
| 2007/0201748 | A1 * | 8/2007 | Bixler | B25F 5/001 382/225 |
| 2008/0164041 | A1 * | 7/2008 | Hess | B25D 16/00 173/109 |
| 2008/0169111 | A1 * | 7/2008 | Duesselberg | B25D 16/006 173/48 |
| 2008/0223592 | A1 * | 9/2008 | Erhardt | B25D 16/006 173/48 |
| 2008/0271905 | A1 * | 11/2008 | Yoshikane | B25D 16/006 173/109 |
| 2008/0308286 | A1 * | 12/2008 | Puzio | B25B 21/00 173/210 |
| 2009/0101376 | A1 * | 4/2009 | Walker | B25B 21/00 173/47 |
| 2009/0126956 | A1 * | 5/2009 | Trautner | B25D 11/106 173/48 |
| 2009/0126957 | A1 * | 5/2009 | Schroeder | B25D 16/006 173/48 |
| 2009/0145618 | A1 * | 6/2009 | Duesselberg | B25D 16/006 173/48 |
| 2009/0308626 | A1 | 12/2009 | Saur | |
| 2010/0054885 | A1 | 3/2010 | Goetz | |
| 2010/0071923 | A1 * | 3/2010 | Rudolph | B25B 21/00 173/48 |
| 2010/0095534 | A1 | 4/2010 | Saiz | |
| 2010/0108339 | A1 * | 5/2010 | Engelfried | B25D 11/062 173/114 |
| 2010/0175902 | A1 | 7/2010 | Rejman | |
| 2010/0212923 | A1 | 8/2010 | Zimmermann | |

(56) References Cited

U.S. PATENT DOCUMENTS

| | | | | |
|---|---|---|---|---|
| 2010/0270045 A1* | 10/2010 | Ullrich | ............... | B25D 16/006 173/47 |
| 2011/0147024 A1* | 6/2011 | Herr | ............... | B25B 23/141 173/48 |
| 2011/0255927 A1* | 10/2011 | Boudreau | ............... | B23B 45/008 408/22 |
| 2012/0099936 A1* | 4/2012 | Bean | ............... | B25F 5/001 408/124 |
| 2012/0193114 A1 | 8/2012 | Schroeder | | |
| 2012/0205131 A1 | 8/2012 | Furusawa | | |
| 2013/0161042 A1* | 6/2013 | Blum | ............... | B23Q 5/12 173/48 |
| 2013/0161043 A1* | 6/2013 | Blum | ............... | B25D 16/006 173/48 |
| 2013/0165291 A1* | 6/2013 | Blum | ............... | F16H 1/28 475/269 |
| 2013/0184116 A1* | 7/2013 | Herr | ............... | F16H 1/46 475/269 |
| 2013/0186663 A1* | 7/2013 | Zhou | ............... | B25F 5/001 173/48 |
| 2013/0269461 A1* | 10/2013 | Hecht | ............... | B25D 11/106 74/335 |
| 2013/0319709 A1* | 12/2013 | Hecht | ............... | B25D 11/062 173/109 |
| 2013/0333907 A1* | 12/2013 | Hecht | ............... | B25B 23/141 173/48 |
| 2014/0036482 A1 | 2/2014 | Vanko | | |
| 2014/0110140 A1* | 4/2014 | Elger | ............... | B25D 16/003 173/48 |
| 2014/0144657 A1* | 5/2014 | Tseng | ............... | B25D 16/006 173/48 |
| 2014/0180292 A1 | 6/2014 | Carusillo | | |
| 2014/0338946 A1* | 11/2014 | Herr | ............... | B25D 16/006 173/104 |
| 2015/0000947 A1* | 1/2015 | Herr | ............... | B25D 16/006 173/125 |
| 2015/0367490 A1* | 12/2015 | Satou | ............... | B25D 11/062 173/48 |
| 2017/0157753 A1* | 6/2017 | Nagasaka | ............... | B25B 21/023 |

OTHER PUBLICATIONS

Wikipedia, "Cam", http://en.wikipedia.org/wiki/Cam (Dec. 17, 2014).
Zhang, Y., et al., "Rapid Design through Virtual and Physicla Prototyping", http://www.cs.cmu.edu/~rapidproto/mechanisms/chpt6.html (Dec. 17, 2014).
V. Ryan, "Unusual Cams", http://www.technologystudent.com/cams/cam9.htm (Dec. 17, 2014).
Physics Forums, "Conversion of rotation to reciprocating motion", https://www.physicsforums.com/threads/conversion-of-rotation-to-reciprocating-motion . . . (Dec. 17, 2014).
Amazon.com, "Dart—Dual Action Rotary Reciprocating Tool—Free Shipping! #5041", http://www.amazon.com/Dart-Action-Rotary-Reciprocating-Shipping/dp . . . , (Dec. 17, 2014).
Rockler, "Universal Scroll Saw Spiral Blades", http://www.rockler.com/universal-scroll-saw-sprial-blades, (Feb. 17, 2016).
Wikipedia, "Scroll saw", https://en.wikipedia.org/wiki/Scroll_saw#Mode_of_operation, Feb. 16, 2016.

* cited by examiner

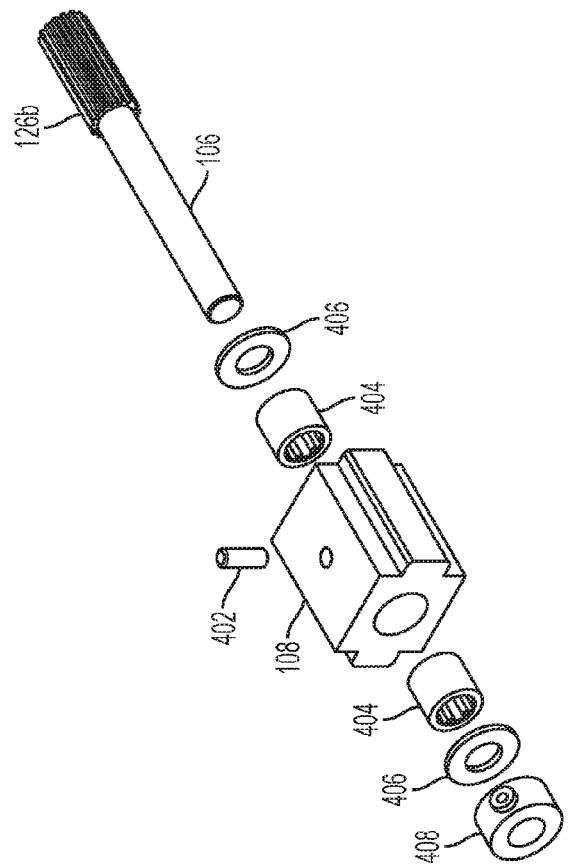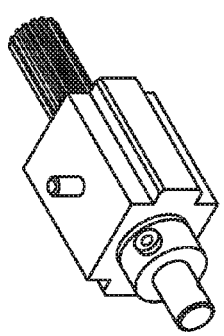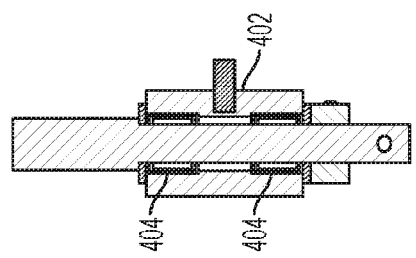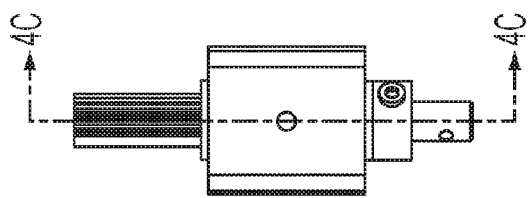

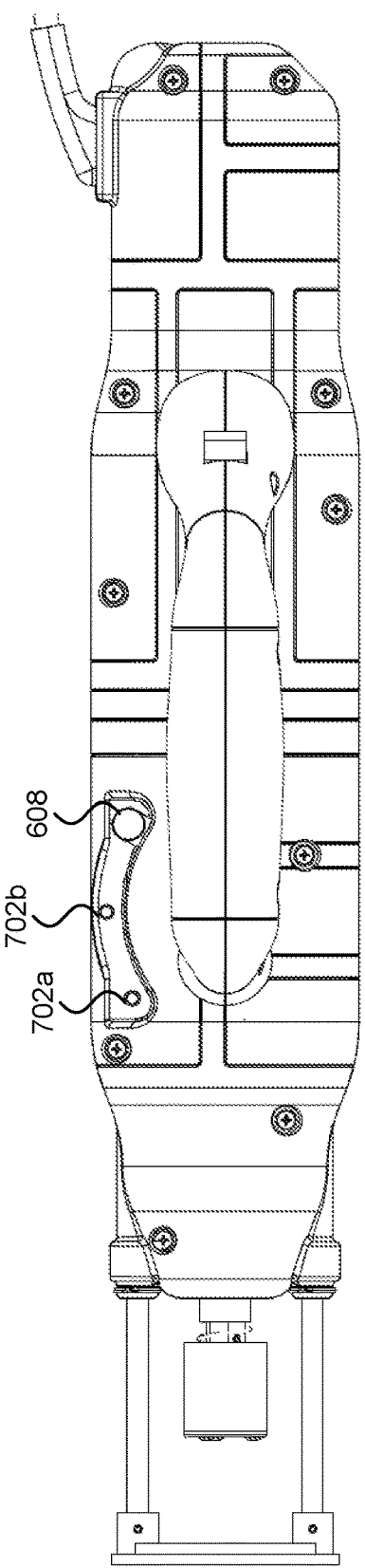

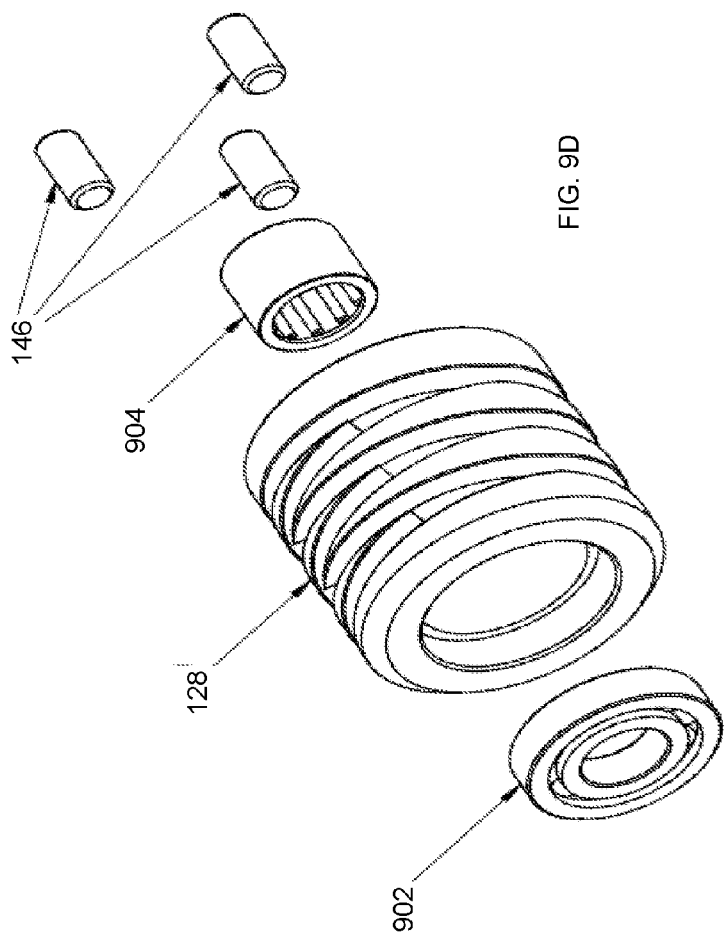
FIG. 9D
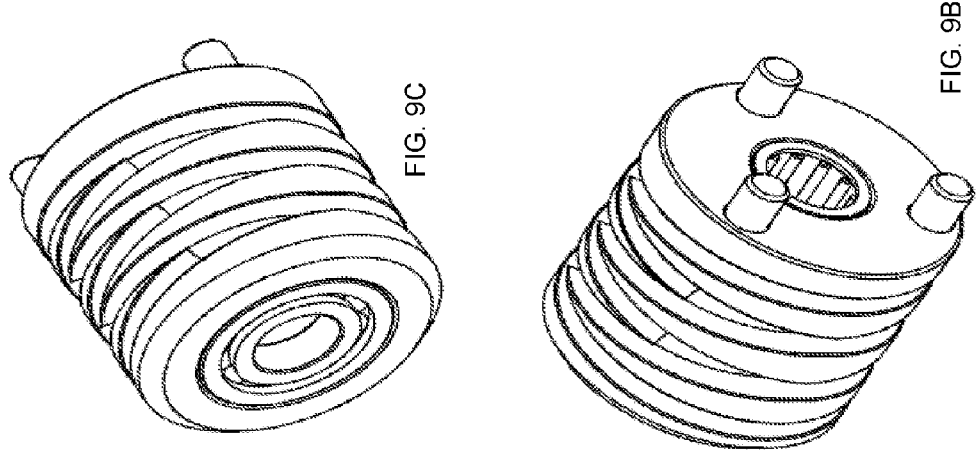
FIG. 9C
FIG. 9B

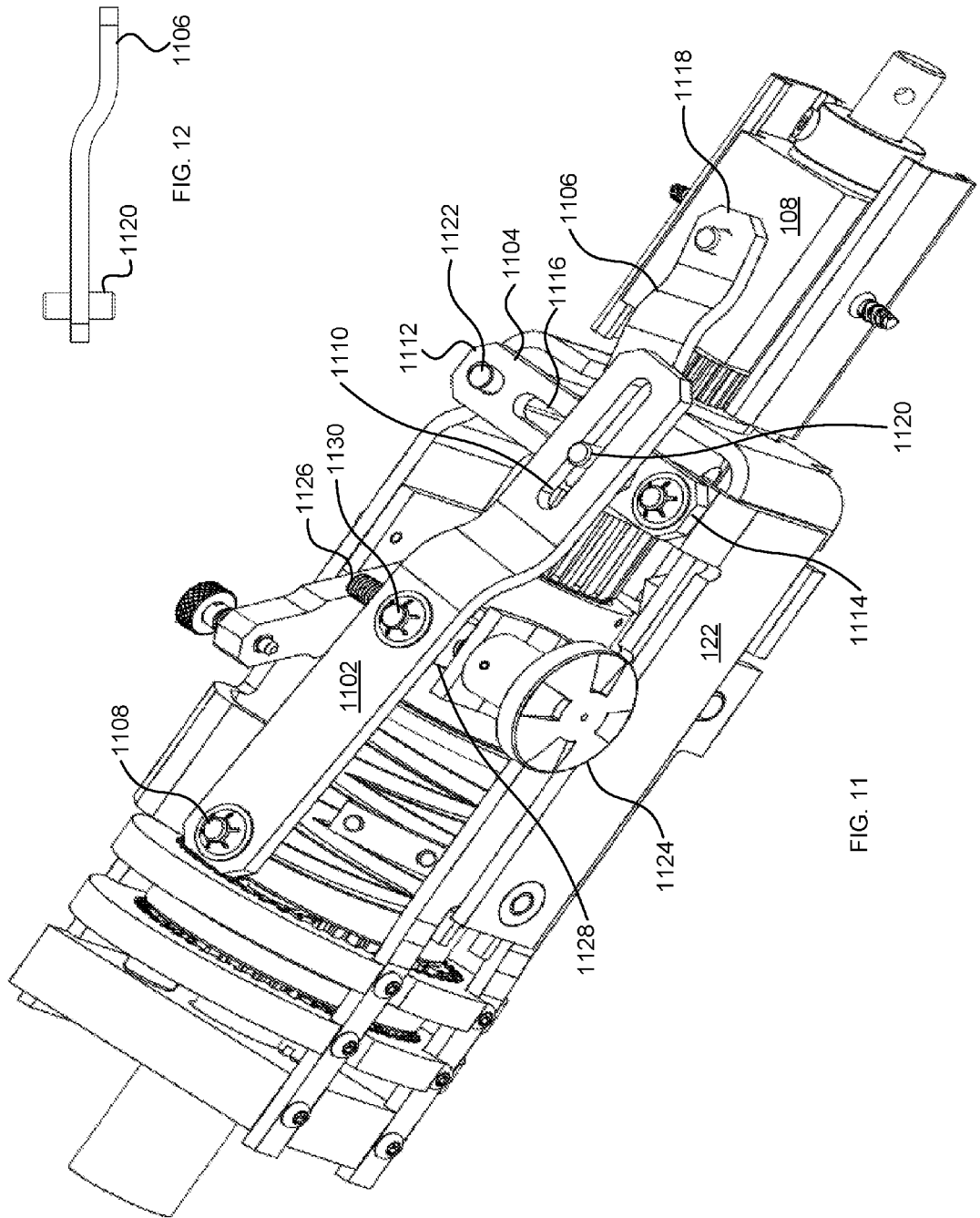

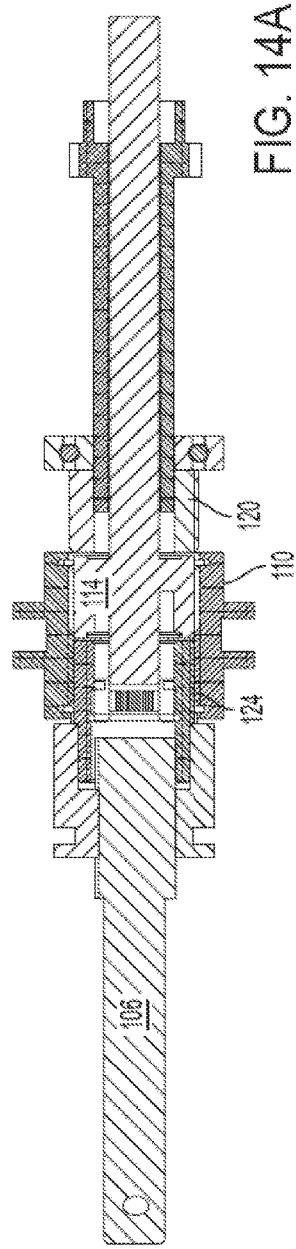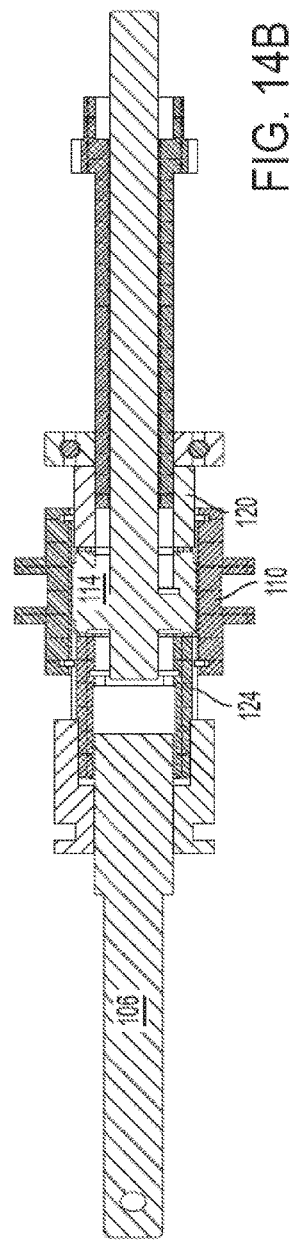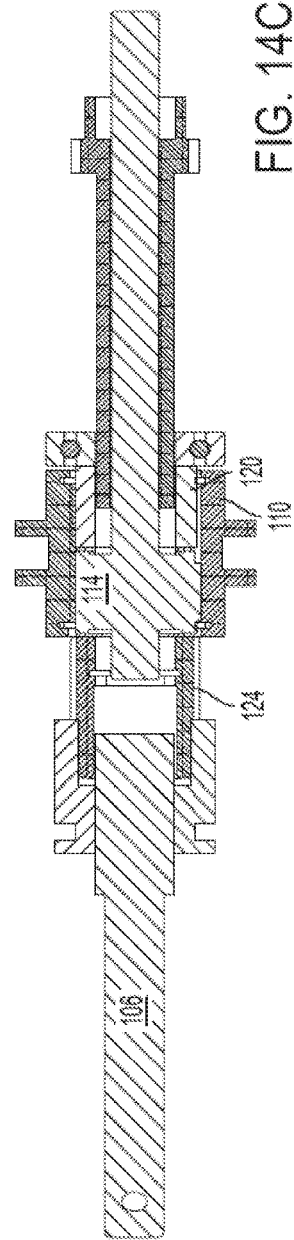

MULTI-MODE DRIVE MECHANISMS AND TOOLS INCORPORATING THE SAME

CROSS-REFERENCE TO RELATED APPLICATIONS

This application claims priority under 35 U.S.C. § 119(e) to U.S. Provisional Patent Application Ser. No. 62/119,367, filed Feb. 23, 2015, the entire content of which is hereby incorporated herein by reference.

BACKGROUND

Rotary saws (also known as spiral cut saws or cut out tools and commercialized under the ROTOZIP™ trademark by Robert Bosch Tool Corporation of Racine, Wis. among others) are commonly used to make cuts without the need for a pilot hole in wall board and other materials. Although such tools are ostensibly designed for one-handed operation, they are prone to walking or wandering, resulting in imprecise cuts.

SUMMARY OF THE INVENTION

The present invention provides a multi-mode drive mechanism. The multi-mode drive mechanism may be employed, for example, in a power tool, for driving a chuck supporting an end effector, such as a drill bit or spiral cut bit, for acting on a work surface. For example, when employed in a power tool, the mechanism can generate rotating, reciprocating, or simultaneous rotating and reciprocating motion. Cutting with simultaneous rotational and reciprocating motion lessens the potential for undesired walking or wandering of the cutting bit by actively removing debris from the cut. Additionally, multi-mode drive mechanisms provide increased functionality in a single tool to accommodate a variety of situations and materials.

One aspect of the invention provides a multi-mode drive mechanism including: an input shaft, a reciprocating assembly, an output shaft, a reciprocating block, and a shift collar. The input shaft terminates in an input external spur gear. The reciprocating assembly includes: a reciprocating hub and a reciprocating shaft. The reciprocating hub is positioned coaxially over the input shaft and adjacent to the input external spur gear. The reciprocating hub includes a hub external spur gear. The reciprocating shaft is adapted and configured to transmit reciprocating force. The output shaft is positioned coaxially in line with the input shaft. The output shaft has a first end terminating in an output external spur gear positioned adjacent to the input external spur gear. The reciprocating block sits over the output shaft, coupled directly or indirectly to the reciprocating shaft. The reciprocating block is adapted and configured to reciprocate the output shaft axially when force is received from the reciprocating shaft and permit rotation of the output shaft. The shift collar includes an internal spur gear complementary to the input external spur gear, the output external spur gear, and the hub external spur gear. The shift collar is slidably positioned over the input external spur gear and adapted and configured to slide between: a first position in which the shift collar engages with the input external spur gear and the output external spur gear to rotate, but not reciprocate, the output shaft; a second position in which the shift collar engages with the input external spur gear, the output external gear, and the hub external gear spur to both rotate and reciprocate the output shaft; and a third position in which the shift collar engages with the input external gear and the hub external gear spur to reciprocate, but not rotate, the output shaft.

The reciprocating assembly can further include: a cylindrical cam positioned coaxially over the input shaft and rotationally coupled to the reciprocating hub; and a follower including one or more dowel pins adapted and configured to travel along grooves in the cylindrical cam to translate rotation of the cylindrical cam into reciprocating linear force.

The reciprocating assembly can further include a crank rotationally coupled to the reciprocating hub.

The tool can further include a lever coupled to the shift collar and adapted and configured to move advance the shift collar between the first position, the second position, and the third position.

The reciprocating shaft can be indirectly coupled to the reciprocating block via a stroke depth adjustment mechanism. The stroke depth adjustment mechanism can include: a stroke control lever rotatable about a fixed pivot point, the stroke control lever defining a first slot; a stroke adjuster rotatably fixed at a first end and rotatably coupled to the reciprocating shaft at a second end, the stroke adjuster defining a second slot; and a slave link rotatably coupled to the reciprocating block at a first end, the slave link having a pin at the second end, the pin lying within both the first slot of the stroke control lever and the second slot of the stroke adjuster, such that rotation of the stroke control lever moves the pin within the second slot of the stroke adjuster and adjusts a length of a reciprocating stroke applied to the slave link.

The tool can further include: a first synchronization ring adjacent to a first end of the shift collar; and a second synchronization ring adjacent to a second end of the shift collar.

The tool can further include a reduction gearing assembly coupled to the reciprocating hub. The reduction gearing assembly can be a planetary gearing.

The output shaft can further include a slip joint between adapted and configured to accommodate reciprocation and rotation of the output shaft.

Another aspect of the invention provides a rotary and reciprocating tool including: an input shaft, a reciprocating shaft, an output shaft, a reciprocating block, a stroke depth adjustment mechanism, a shift collar, a first synchronization ring, a second synchronization ring, and a housing. The input shaft terminates in an input external spur gear. The reciprocating assembly includes: a reciprocating hub, a planetary reduction gearing assembly, a cylindrical cam, a follower, and a reciprocating shaft. The reciprocating hub is positioned coaxially over the input shaft and adjacent to the input external spur gear. The reciprocating hub includes a hub external spur gear. The planetary reduction gearing assembly includes a stationary ring gear, a central sun gear, and a plurality of planet gears between the stationary ring gear and central sun gear. The sun gear is coupled to the reciprocating hub. The cylindrical cam is positioned coaxially over the input shaft and coupled to the planet gears of the planetary reduction gearing assembly. The follower includes one or more dowels adapted and configured to travel along grooves in the cylindrical cam to translate rotation of the cylindrical cam into linear force. The reciprocating shaft is adapted and configured to transmit reciprocating force. The output shaft is positioned coaxially in line with the input shaft. The output shaft includes a first end terminating in an output external spur gear positioned adjacent to the input external spur gear and a second end terminating in a chuck. The reciprocating block sits over the output shaft and is adapted and configured to: reciprocate the output shaft axially when force is received; and permit rotation of the output shaft. The stroke depth adjustment mechanism includes: a stroke control lever, a stroke adjuster, and a slave link. The stroke control lever is rotatable about a fixed pivot point. The stroke control lever defines a first slot. The stroke adjuster is rotatably fixed at a first end and rotatably coupled to the reciprocating shaft at a second end. The stroke adjuster defines a second slot. The slave link is rotatably coupled to the reciprocating block at a first end. The slave link includes a pin at the second end. The pin lies within both the first slot of the stroke control lever and the second slot of the stroke adjuster, such that rotation of the stroke control lever moves the pin within the second slot of the stroke adjuster and adjusts a length of a reciprocating stroke applied to the slave link. The shift collar includes an internal spur gear complementary to the input external spur gear, the output external spur gear, and the hub external spur gear. The shift collar is slidably positioned over the input external spur gear and adapted and configured to slide between: a first position in which the shift collar engages with the input external spur gear and the output external spur gear to rotate the output shaft; a second position in which the shift collar engages with the input external spur gear, the output external gear, and the hub external gear spur to rotate and reciprocate the output shaft; and a third position in which the shift collar engages with the input external gear and the hub external gear spur to reciprocate the output shaft. The first synchronization ring is adjacent to a first end of the shift collar. The second synchronization ring is adjacent to a second end of the shift collar.

The rotary and reciprocating tool can further include a shift lever including: a fixed first end mounted at a fulcrum point; a user-movable second end; and a pin mounted between the fixed first end and the user-movable second end. The pin is engaged with shift collar such that movement of the shift lever causes movement of the shift lever. The housing can include a slot from which the shift lever extends. The housing can further include three detents along the slot, each of the detents corresponding to one of the first position, the second position, and the third position.

The rotary and reciprocating tool can further include: a nut rotatably coupled to the stroke control lever; a threaded rod received within the nut; and a stroke control adjustment knob external to the housing and coupled to the threaded rod such that rotation of the stroke control adjustment knob moves the stroke control lever.

The rotary and reciprocating tool can further include a base plate adapted and configured to hold the rotary and reciprocating tool at a defined distance from a surface.

The rotary and reciprocating tool can further include an end effector coupled to the output shaft. The end effector can be a tool-less bit holder.

The rotary and reciprocating tool can further include a rotary power source coupled to or adapted and configured for coupling to the input shaft. The rotary power source can be an electric motor. The rotary power source can be selected from the group consisting of: a pneumatic motor, an hydraulic motor, and a combustion engine.

DESCRIPTION OF THE FIGURES

For a fuller understanding of the nature and desired objects of the present invention, reference is made to the following detailed description taken in conjunction with the following figures.

FIGS. 4A-4D depict an output shaft assembly according to an embodiment of the invention.

FIGS. 7A and 7B depicts the positioning of a first end of a lever protruding from a housing according to an embodiment of the invention.

FIGS. 9A-9D depict a cylindrical cam according to an embodiment of the invention.

FIG. 11 depicts a stroke depth control mechanism according to an embodiment of the invention.

FIG. 12 depicts a slave link according to an embodiment of the invention.

FIGS. 14A-14C depict cross-sectional views of the selective engagement of a shift collar according to an embodiment of the invention.

DEFINITIONS

The instant invention is most clearly understood with reference to the following definitions.

As used in the specification and claims, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, as used herein, the term "or" is understood to be inclusive.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION

Aspects of the invention provide multi-mode drive mechanisms and tools incorporating the same that generate rotating, reciprocating, or simultaneous rotating and reciprocating motion. Without being bound by theory, it is believed that cutting with simultaneous rotational and reciprocating motion lessens the potential for undesired walking or wandering of the cutting bit by actively removing debris from the cut. Additionally, multi-mode drive mechanisms provide increased functionality in a single tool to accommodate a variety of situations and materials.

Multi-Mode Drive Mechanism

Figure 1:
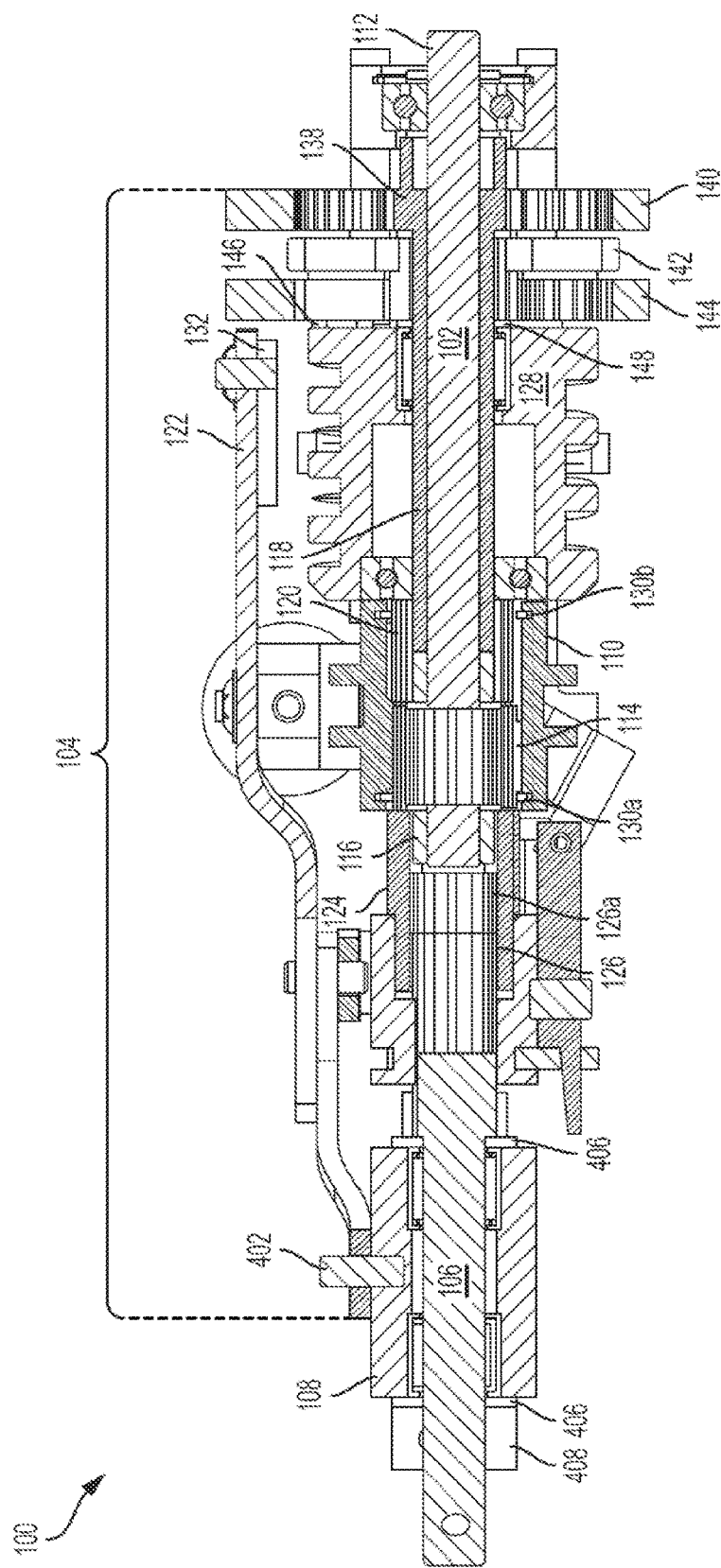
FIG. 1 depicts a partial cross-sectional view of a multi-mode drive mechanism according to an embodiment of the invention in which the gear teeth of several gears extend out of the cross-sectional plane. (The cross-sectional plane is the same as defined in the context of FIG. 13A, but omits elements such as the housing in order to provide a clearer view of the internal operation of the multi-mode drive mechanism.)

Referring now to FIG. 1, one embodiment of the invention provides a multi-mode drive mechanism 100 including an input shaft 102, a reciprocating assembly 104, an output shaft assembly 106, a reciprocating block 108, and a shift collar 110.

Figure 2A:
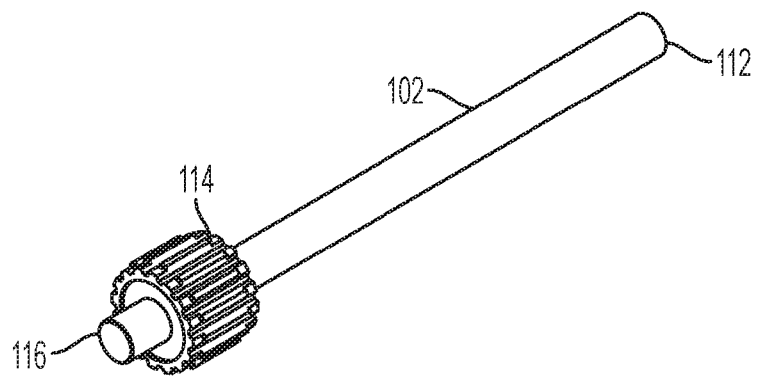
FIG. 2A depicts a perspective view of an input shaft according to an embodiment of the invention.
Figure 2B:
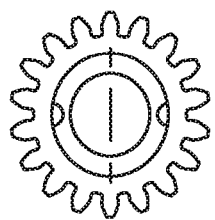
FIG. 2B depicts an axial view (from first end 112) of the input shaft according to an embodiment of the invention.

The input shaft 102 can be coupled to and/or be driven to rotate about its axis of elongation by a power source at a first end 112. As more clearly seen in FIGS. 2A and 2B, the input shaft 102 can include an input external spur gear 114 at a second end 116 fixedly joined thereto to rotate therewith.

Figure 3:
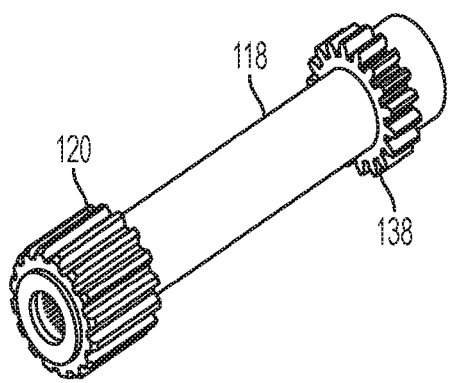
FIG. 3 depicts a reciprocating shaft according to an embodiment of the invention.

The reciprocating assembly 104 can include a reciprocating hub 118 positioned coaxially over the input shaft 102 and adjacent to the input external spur gear 114. As more clearly seen in FIG. 3, the reciprocating hub 118 can include a hub external spur gear 120. Further, the reciprocating hub 118 can be hollow to accommodate the input shaft 102 and allow the input shaft 102 to rotate freely within the hollow portion of the reciprocating hub 118, so that reciprocating hub 118 is not directly driven to rotate in response to rotation of the input shaft 102. Instead, the reciprocating hub 118 can remain stationary when the mechanism 100 is actuated to a rotation-only mode or can be selectively engaged as described herein to provide reciprocation with or without rotation.

A reciprocating shaft 122 can be adapted and configured to transmit reciprocating force generated by rotation of the reciprocating hub 118 to a reciprocating block 108 as will be discussed in greater detail herein.

The output shaft assembly 106 can be positioned coaxially in line with the input shaft 102. The output shaft assembly 106 can include a first end terminating in an output external spur gear 124 fixed thereto to rotate therewith in a position adjacent to the input external spur gear 114. A slip joint 126 (e.g., a spline or complementary internal spur gear 126a and external spur gear 126b) can optionally be provided along the output shaft assembly 106 to better accommodate reciprocation of the output shaft assembly 106 while maintaining one end of the output shaft assembly 106 in proximity to the input external spur gear 114. As output shaft assembly 106 is reciprocated, the external spur gear 124 remains in a constant axial position and the external spur gear 126b maintains contact within internal spur gear 126a. As a result, the output shaft assembly 106 can be continuously rotated (when the mechanism is actuated to a mode including rotation) even when at peak reciprocation.

The reciprocating block 108 sits over the output shaft assembly 106 as depicted in FIGS. 1 and 4A-4D. For example, the reciprocating block 108 can define a cylindrical hole through which the output shaft assembly 106 can be received and permitted to rotate freely. The reciprocating block 108 can also be coupled directly or indirectly to the reciprocating shaft 122 (e.g., via a dowel pin 402 press fit into reciprocating block 108) so that the output shaft assembly 106 is reciprocated when force is received from the reciprocating shaft 122 and the output shaft assembly 106 can rotate about a central axis of the multi-mode drive mechanism 100 regardless of whether the reciprocating shaft 122 and the reciprocating block 108 are being reciprocated. In this manner, the output shaft assembly 106 can provide rotating, reciprocating, or both simultaneous rotating and reciprocating motion depending on actuation of the shift collar 110 between a first, second, and third position as further discussed herein. Needle bearings 404 (or other roller bearings) can be press fit within reciprocating block 108 as best seen in FIG. 4C in order to support and reduce friction between the sometimes-rotating output shaft assembly 106 and the reciprocating block 108. Thrust bearings 406 and/or shaft collar(s) 408 can be provided on either or both sides of reciprocating block 108 to transfer reciprocating motion of the reciprocating block 108 to the output shaft assembly 106.

Figure 5C:
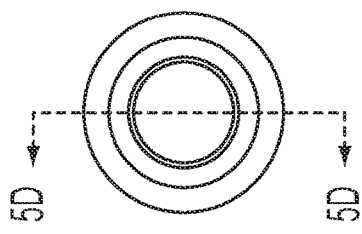
FIGS. 5A-5E depict a shift collar according to an embodiment of the invention.
Figure 5B:
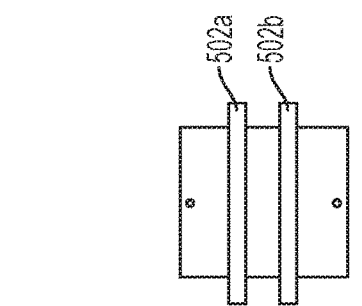
Figure 5A:
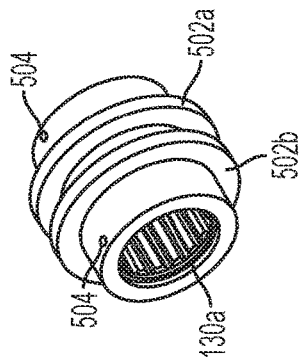
Figure 5E:
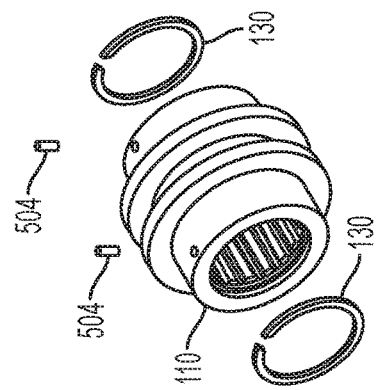
Figure 5D:
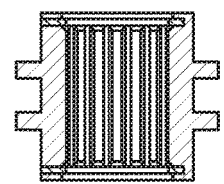
Figure 6A:
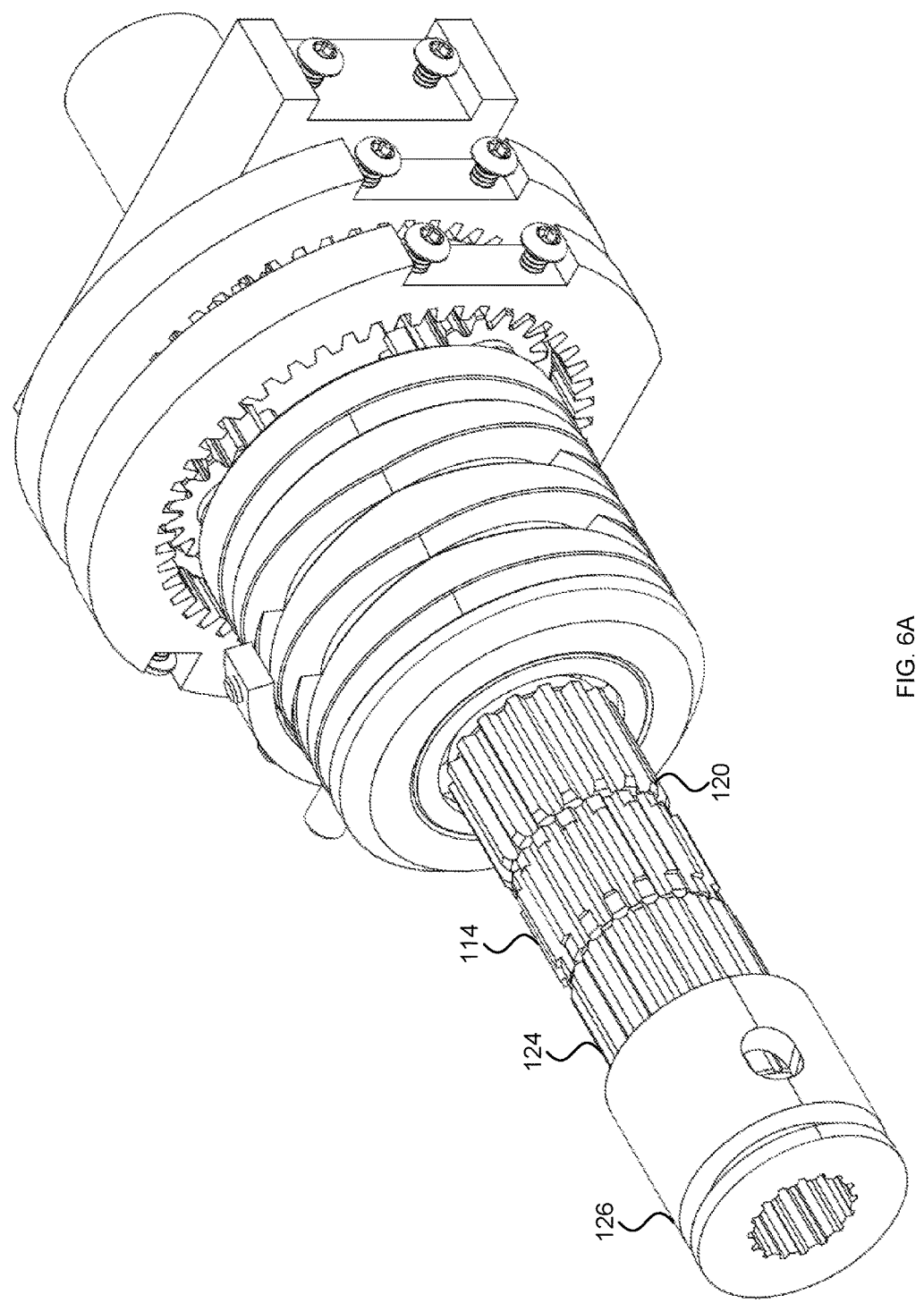
FIG. 6A depicts the positioning of the input external spur gear, the output external spur gear, and the hub external spur gear according to an embodiment of the invention.

As best illustrated in FIGS. 5A, 5D, and 5E, shift collar 110 can define an internal spur gear complementary to the input external spur gear 114, the output external spur gear 124, and the hub external spur gear 120, the adjacent positioning of which is best illustrated in FIG. 6A.

As best illustrated in FIGS. 14A-14C, the shift collar 110 can be slidably positioned over the input external spur gear 114 and adapted and configured to slide between multiple distinct positions corresponding to multiple distinctly different modes of operation. More specifically, the shift collar 110 is configured to slide between a first position, a second position, and a third position.

The first position is depicted in FIG. 14A. In this first position, the shift collar 110 engages with both the input external spur gear 114 and the output external spur gear 124. This mechanically couples the output external spur gear 124 to the input external spur gear 114. Accordingly, rotation of the input shaft 102 (and input external gear 114) results in corresponding rotation of the output external spur gear 124 and output shaft assembly 106 along a central axis of the multi-mode drive mechanism 100. Notably, in this position, the shift collar 110 is not mechanically coupled to the hub external spur gear 120, and as a result does not drive a reciprocation assembly responsible for causing reciprocation of the output shaft assembly 106. Accordingly, the first position provides a first mode of operation in which the output shaft assembly 106 (and any end effector coupled thereto) is caused to rotate about its axis, but not to reciprocate along its axis. This "rotation-only" mode of operation may be useful, in the example of a power tool, for cutting of relatively thin, flexible, and/or unsupported materials (e.g., glass) that may not accommodate reciprocation, when a consistent depth of cut is desired (e.g., when routing, carving, etching, engraving, removing grout from between tiles, and the like), and/or when plunge cutting into a material.

The second position is depicted in FIG. 14B. In this second position, the shift collar 110 is moved axially relative to its position in FIG. 14A. In this second position, the shift collar 110 engages with the input external spur gear 114, the output external spur gear 124, and the hub external gear spur 120. This mechanically couples the input external spur gear 114, the output external spur gear 124, and the hub external gear spur 120. Accordingly, rotation of the input shaft 102 (and input external gear 114) results in corresponding rotation of the output external spur gear 124 and output shaft assembly 106 along a central axis of the multi-mode drive mechanism 100. Further, the same rotation of the input shaft 102 (and input external gear 114) concurrently results in corresponding rotation of the output external spur gear 124 to rotate the output shaft assembly 106 along a central axis of the multi-mode drive mechanism. Further still, the same rotation of the input shaft 102 (and input external gear 114) concurrently results in corresponding rotation of the hub external spur gear 120 to drive a reciprocation assembly that causes reciprocation of the reciprocation shaft 122, reciprocation block 108, output shaft assembly 106. Accordingly, the second position of the shift collar provides a second mode of operation in which the output shaft assembly 106 (and any end effector coupled thereto) is caused to rotate about its axis and to reciprocate along its axis. This "rotation and reciprocation" mode of operation may be useful, in the example of a power tool, for cutting of relatively thick material (e.g., ½", ¾", and the like) materials such as tile, stone, wall (e.g., drywall, plasterboard/blueboard), plaster and wooden lath, cementitious backer board, and the like), wood (e.g., dimensional lumber, plywood, oriented strand board (OSB), and the like), laminates, plastic, vinyl, fiberglass, metals (e.g., aluminum siding, steel, and the like), cementitious siding, and the like by actively removing dust and debris from the cut.

The third position is depicted in FIG. 14C. In this third position, the shift collar 110 is moved axially relative to its position in FIG. 14B. In this third position, the shift collar 110 engages with the input external spur gear 114, and the hub external gear spur 120, but disengages from the output external spur gear 124. This mechanically couples the input external spur gear 114, the hub external spur gear 120, and also decouples the input external spur gear 114 from the output external gear spur 124. Accordingly, rotation of the input shaft 102 (and input external gear 114) results in corresponding rotation of the hub external spur gear 120 to drive a reciprocation assembly that causes reciprocation of the reciprocation shaft 122, reciprocation block 108, output shaft assembly 106. Notably, in this position the shift collar 110 is not mechanically coupled to the output external spur gear 124, and as a result does not drive rotation of the output shaft 106. Accordingly, in this third mode of operation, the output shaft assembly 106 (and any end effector coupled thereto) is caused to reciprocate along its axis, but not to rotate about its axis. This "reciprocation-only" mode of operation may be useful, in the example of a power tool, as a replacement for a conventional jigsaws, scroll saws, coping saws, and the like in a variety of materials such as wood. The "reciprocation-only" mode may be preferred to eliminate any tendencies for walking or wandering of the cutting bit in conventional saws.

Figure 6B:
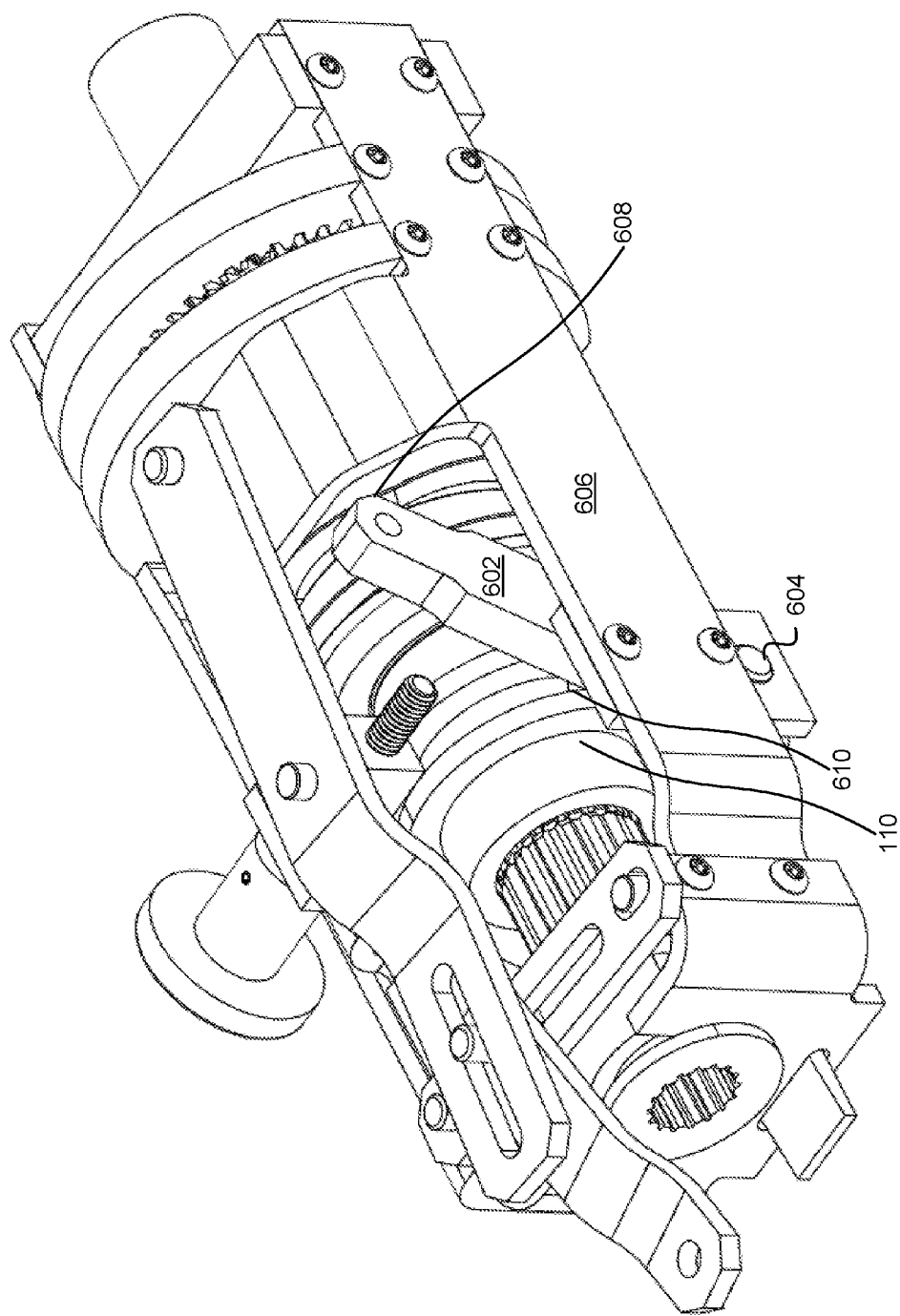
FIG. 6B depicts the arrangement of a lever for advancing the shift collar between the first position, the second position, and the third position according to an embodiment of the invention.
Figure 7B:
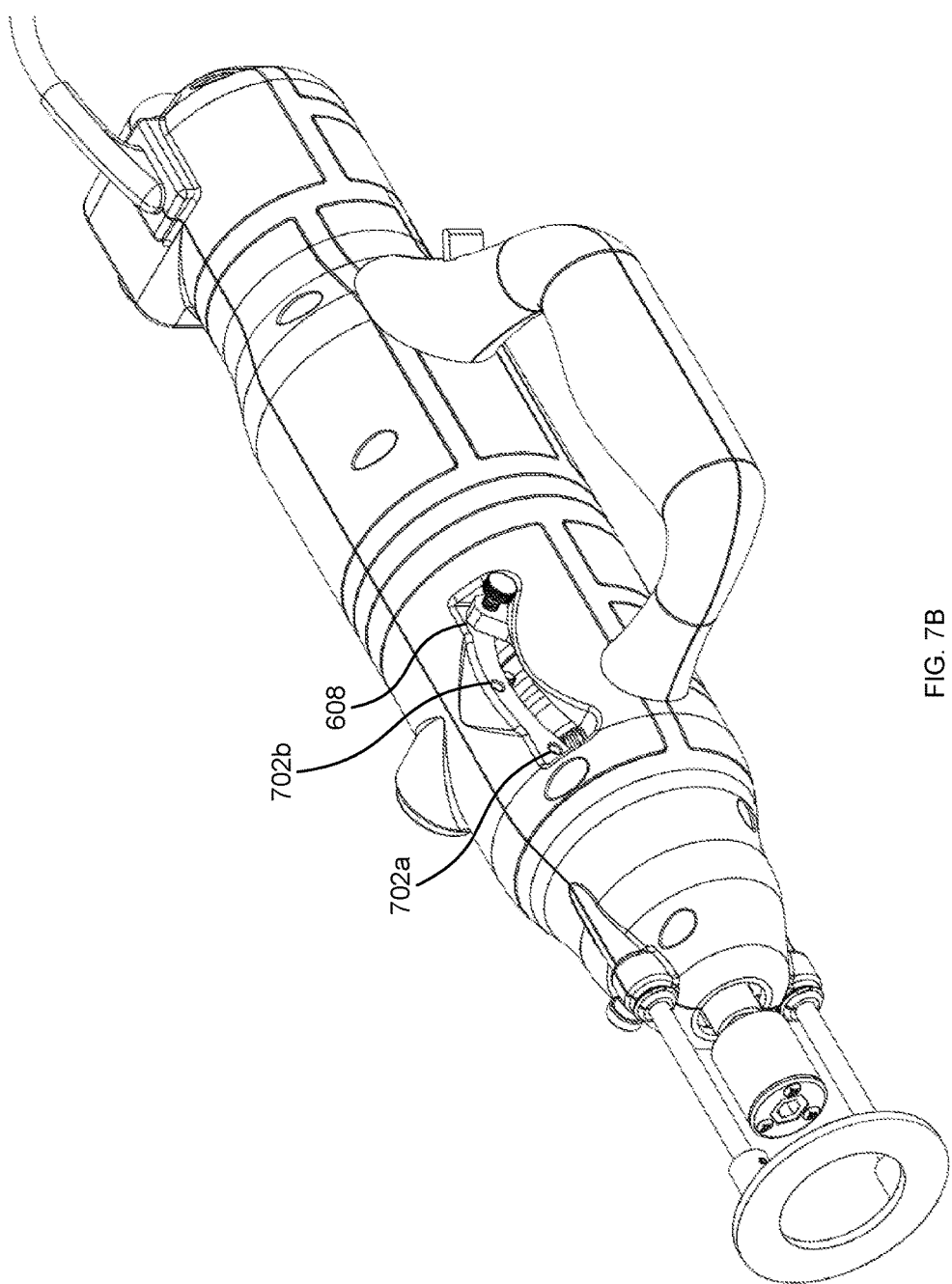
Figure 8C:
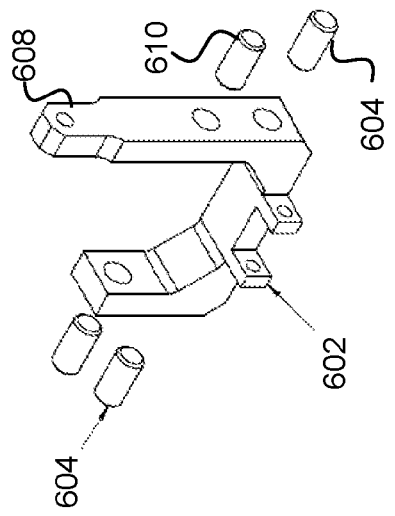
FIGS. 8A-8C depict a lever according to an embodiment of the invention.
Figure 8B:
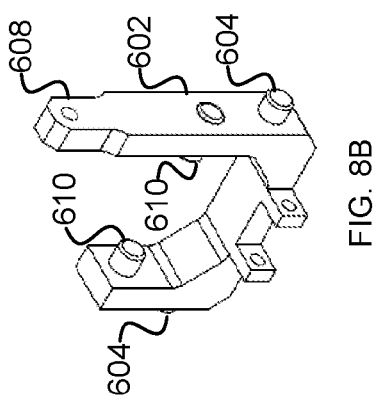
Figure 8A:
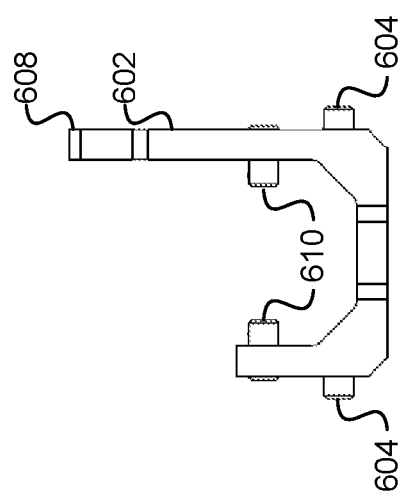

Shift collar 110 can be selectively positioned in any of the first position, the second position, and the third position by a variety of mechanisms. In one embodiment best depicted in FIG. 6B, a first end of a lever 602 is mounted at a fulcrum point (e.g., defined by pin 604) on the housing 606 of the multi-mode drive mechanism 100, a second end 608 of the lever 602 is movable by the user (e.g., from outside the housing as seen in FIGS. 7A and 7B), and the center of the lever 602 is coupled to the shift collar 110 (e.g., via a pin 610 coupled to the lever 602 and engaged between shoulders 502a, 502b) so that pivoting of the lever moves the shift collar 110 between the first position, the second position, and the third position. In some embodiments, the housing can define one or more detents 702 depicted in FIG. 7A that mate with a complementary structure on the lever 602 to selectively retain or hold the lever 602 (and, by extension, the shift collar 110) in the first position, the second position, or the third position. Lever 602 is further depicted in FIGS. 8A-8C along with pins 610 for engaging the shift collar 110 and fulcrum pins 604.

In order to best facilitate shifting between the first position, the second position, and the third position (both when the output shaft 102 and the shift collar 110 are stationary or moving), the shift collar 110 can include one or more synchronization rings 130a, 130b that ride in annular grooves adjacent to the ends of the shift collar 110. Synchronization rings 130a, 130b can be held in place within the grooves by dowel pins 504 as best seen in FIGS. 5A and 5E, but are allowed to freely rotate within the annular groove. As in an automotive transmission, the synchronization rings can engage, accelerate, and align the output external spur gear 124 or the hub external gear spur 120 with the internal spur gears of the shift collar 110 to facilitate meshing of the gears.

Accordingly, the multi-mode drive mechanisms of the present invention provides multiple modes of operation according to a user's selection of an operational mode by moving the shift collar 110 between a first, a second, and a third position. Thus, for example, a power tool including the multi-mode drive mechanism is particularly versatile relative to conventional power tools having a single mode operation (rotation or reciprocation) such as spiral saws, jig saws, scroll saws, routers, and the like. Therefore, the tools described herein can not only replace multiple tools, but also provide a unique mixed mode of operation having improved performance over existing cutting tools.

Reciprocating Assemblies

The multi-mode drive mechanism 100 can include several structures for converting rotational force received by the hub external gear spur 120 into reciprocating force.

Figure 9A:
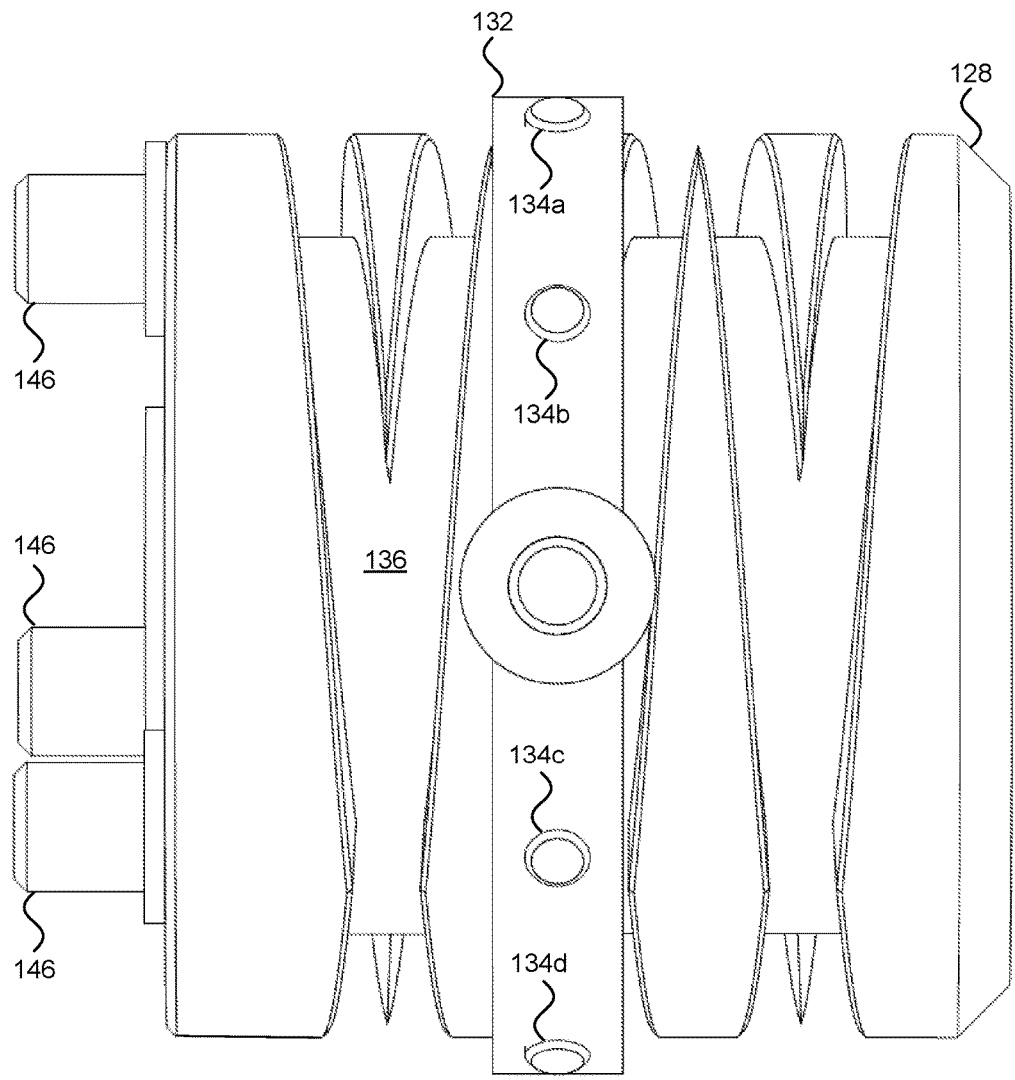

In one embodiment depicted in FIGS. 1 and 9A-9D, the reciprocating assembly 104 can further include a cylindrical cam 128 positioned coaxially over the input shaft 102 and rotationally coupled to the reciprocating hub 118 (either directly or indirectly via additional gears as discussed herein). As seen most clearly in FIG. 9A, the reciprocating assembly 104 can also include a follower 132 including one or more dowel pins 134a-134d sized and positioned to travel along helical grooves 136 in the cylindrical cam 128 to translate rotation of the cylindrical cam 128 into linear, reciprocating force. One or more ball bearings 902 and/or needle bearings 904 can placed within cylindrical cam 128 to facilitate rotation of the cylindrical cam 128 over reciprocating hub 118 as best shown in FIG. 9D.

In another embodiment (not shown), the reciprocating assembly 104 can instead include a crank rotationally coupled to the reciprocating hub 118. In such an embodiment, the crank has an axis of rotation perpendicular to the rotational axis of the input shaft and the reciprocating shaft 122 is directly or indirectly coupled to an off-center location on the crank.

In still another embodiment (not shown), a scotch yoke is utilized to convert rotational force of a crank into reciprocating force.

Figure 10B:
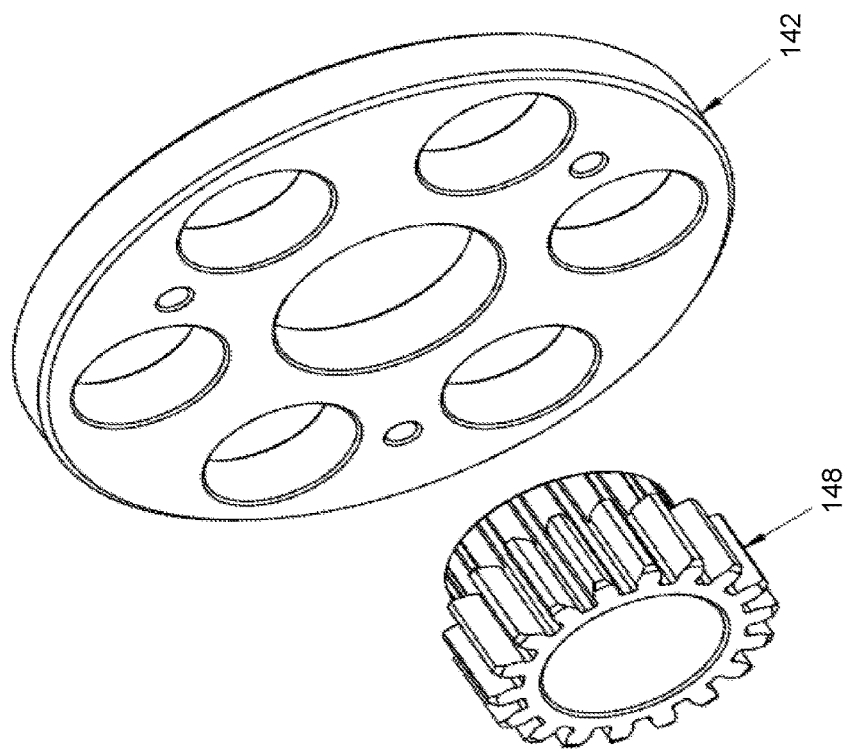
FIGS. 10A and 10B depict a spider/crankset and sun gear assembly according to an embodiment of the invention.
Figure 10A:
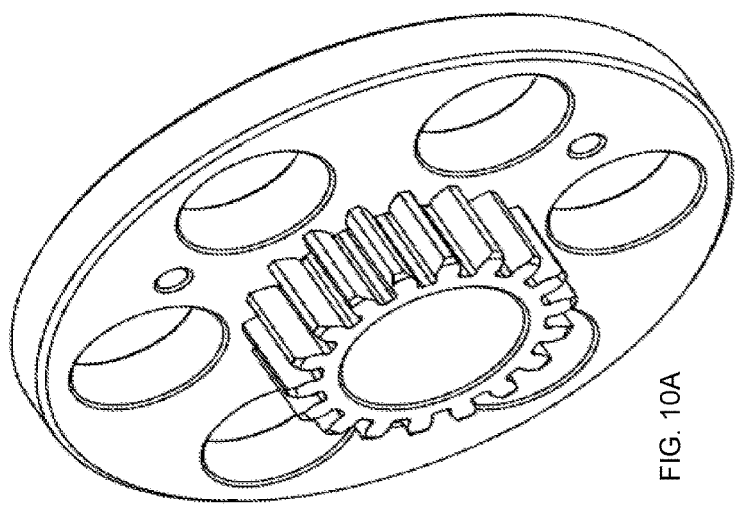

In some embodiments, gearing can be utilized to modify the reciprocating speed and/or the reciprocating force relative the rotational speed/force. For example, a reduction gearing assembly can be utilized to reduce the reciprocating speed and increase the reciprocating force. In one embodiment, one or more planetary gearing assemblies are utilized. In the embodiment of the invention depicted herein, two planetary gearing assemblies are used. Rotational power is input to the central sun gear in each planetary gearing assembly and the outer ring or annular gear is held stationary so that power is output by travel of the planet gears. In the embodiment best depicted in FIG. 1, rotational power is provided by the reciprocating hub 118 to the central sun gear 138 of the first planetary gearing assembly 140. Travel of the planet gears moves dowel pins to rotate a spider or crankset 142, which is coupled to the sun gear 148 of the second planetary gearing assembly 144 as seen in FIGS. 10A and 10B. Referring again to FIG. 1, rotation of the sun gear 148 by the spider or crankset 142 turns the planet gears of the second planetary gearing assembly 144, which are coupled to the cylindrical cam 128 via dowel pins 146 best seen in FIGS. 9A-9D.

Stroke Depth Adjustment Mechanism

Embodiments of the invention can include a stroke depth adjustment mechanism adapted and configured to regulate the stroke length of reciprocation of the output shaft assembly 106.

Referring now to FIG. 11, in one embodiment of the invention, the stroke length control mechanism includes a stroke control lever 1102, a stroke adjuster 1104, and a slave link 1106.

The stroke control lever 1102 is rotatable about a fixed pivot point 1108. The stroke control lever 1102 also defines a first slot 1110.

The stroke adjuster 1104 is rotatably fixed at a first end 1112 and rotatably coupled to the reciprocating shaft at a second end 1114. The stroke adjuster 1104 defines a second slot 1116.

The slave link 1106 is rotatably coupled to the reciprocating block 108 at a first end 1118. The slave link 1106 also includes a pin 1120 at a second end (sandwiched between and obscured by the stroke control lever 1102 and the stroke adjuster 1104). As best seen in FIG. 12, the pin 1120 can extend beyond both sides of the slave link 1106 in order to lie within both the first slot 1110 of the stroke control lever 1102 and the second slot 1116 of the stroke adjuster 1104. Rotation of the stroke control lever 1102 about pivot point 1108 moves the pin 1120 within the second slot 1116 of the stroke adjuster 1104 and adjusts a length of a reciprocating stroke applied to the slave link 1106 when the reciprocating shaft 122 advances the second end 1114 of the stroke adjuster 1104 to rotate the stroke adjuster 1104 about dowel pin 1122.

The rotational or angular position of the stroke control lever 1102 can be controlled through a variety of mechanisms. In one embodiment, rotation of a knob 1124 rotates a threaded bolt or screw 1126 received within a nut 1128 rotatably coupled to the stroke control lever 1102 via dowel pin 1130. Such a stroke depth mechanism can be useful, for example, to focus the cutting force on the thickness of the material, avoid contacting materials (e.g., insulation, pipes, wires, and the like) that may be under and/or behind a material to be cut, and the like.

Tools Incorporating Multi-Mode Drive Mechanisms

Figure 13A:
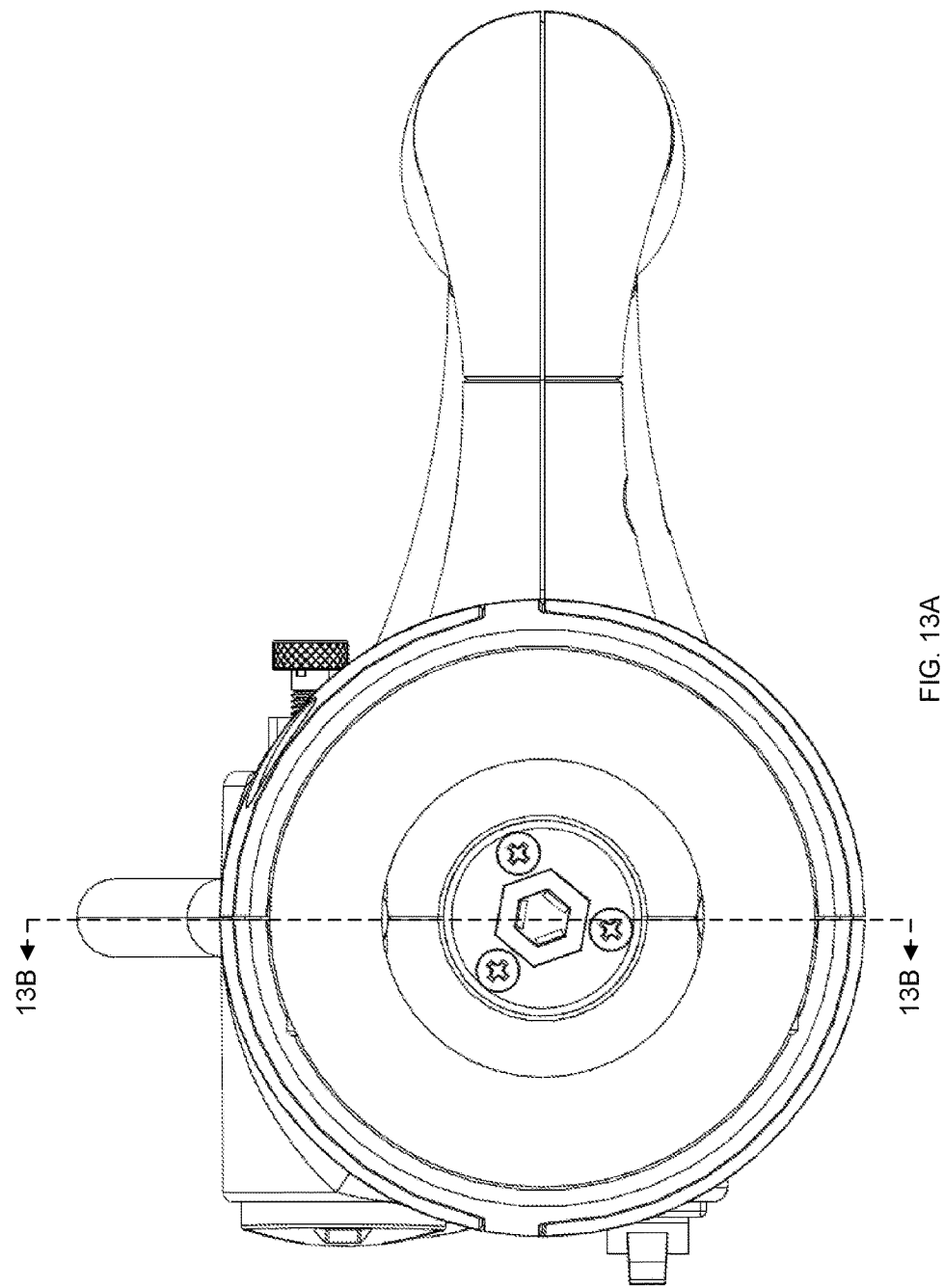
FIG. 13A depicts a bottom view of a tool incorporating a multi-mode drive mechanism according to an embodiment of the invention.
Figure 13B:
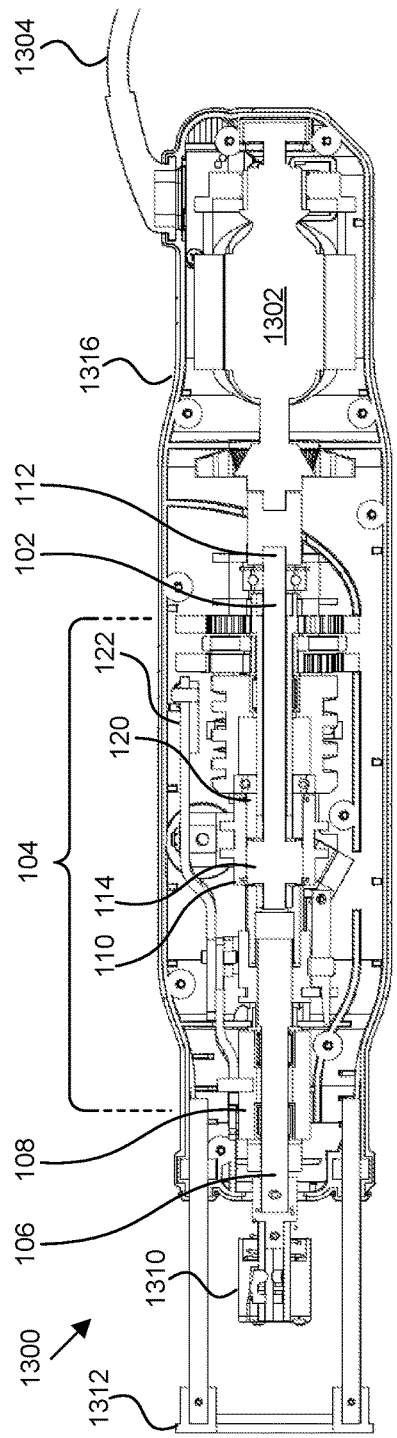
FIGS. 13B and 13C depict a cross-sectional and side views of a tool incorporating a multi-mode drive mechanism according to an embodiment of the invention.
Figure 13C:
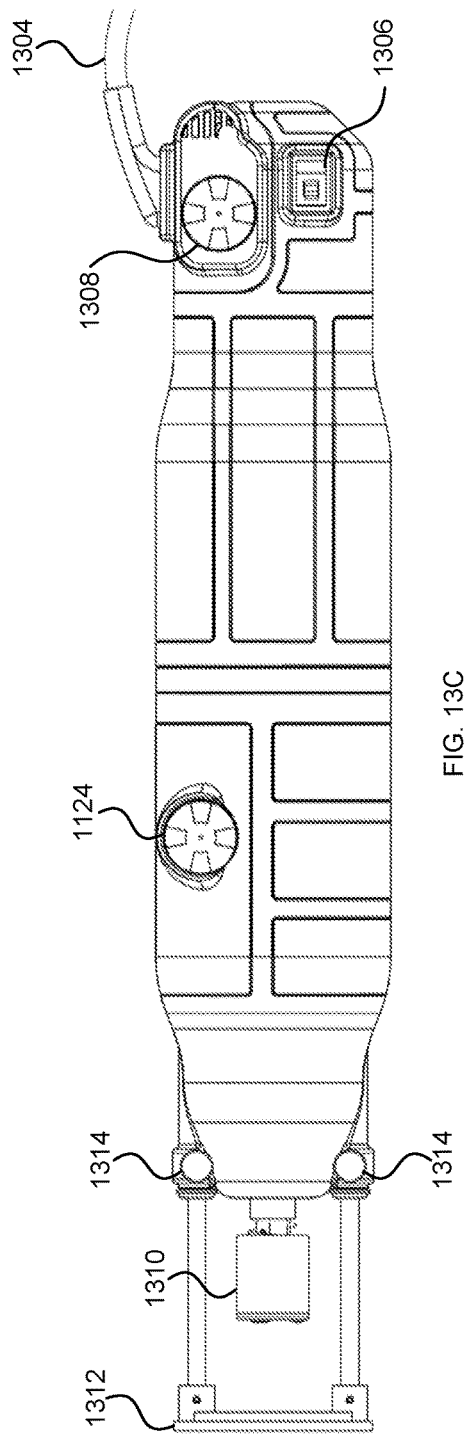

Referring now to FIGS. 13A-13C, the multi-mode drive mechanisms described can be incorporated within a variety of tools. The input shaft 102 can be driven in either rotational direction by a variety of power sources. Exemplary power sources include electric motors 1302, pneumatic motors, hydraulic motors, combustion engines, and the like. Electric motors 1302 can be powered by alternating current (AC) power sources such as mains power (e.g., 120V, 15 Amp service standard in the United States) through cord 1304 or direct current (DC) power such as batteries. Rechargeable batteries are available in a variety of chemistries including nickel cadmium (NiCd), nickel metal hydride (NiMH), lithium ion (Li-ion), and lithium ion polymer (Li-ion polymer), in a variety of voltages including 7.2, 8, 9.6, 12, 14.4, 18, 20, 24, and 36, and using a variety of physical and electrical interfaces. Embodiments of the tool 1300 described herein can be adapted to incorporate any power source that may be preferred by a manufacturer.

In some embodiments, the multi-drive mechanism is incorporated in a modular tool adapted and configured for coupling to a plurality of power sources and/or as one of a plurality of modular tools adapted and configured for coupling with a single power source. Examples of such modular tool systems include the RIDGID® JOBMAX® system available from RIDGID, Inc. of Newark, Del. (which allows coupling of a variety of tool heads to interchangeable corded, cordless, and pneumatic power sources) and the CRAFTSMAN® BOLT-ON® system available from Sears Brands, LLC of Hoffman Estates, Ill. (which allows coupling of a variety of tool heads to interchangeable corded and cordless power sources).

Tool 1300 can include a housing 1316. Housing 1316 can protect the user from contact with the internal components of the tool 1300, facilitate ergonomic handling of the tool 1300, shield the internal components of the tool 1300 from dirt, and the like. Housing 1316 can be fabricated from a variety of material such as injection molded plastic, cast metal, and the like. In one embodiment, a plastic housing is overmolded in certain regions with an elastomer such as rubber for improved grip, comfort, and/or aesthetics. Various housings can be applied over the same or substantially the same internal components in order to accommodate various tool brands.

Operation of the power source (and, by extension, tool 1300) can be controlled by one or more interfaces such as switches 1306, triggers, dials 1308, sliders, and the like to turn the tool ON/OFF and/or control the rotational speed and/or direction of the tool.

Output shaft assembly 106 can be coupled to an end effector 1310 adapted and configured to hold a bit. End effector 1310 can be coupled to the output shaft assembly 106 by variety of techniques including threaded attachment, press or interference fitting, swaging, brazing, welding, and the like. Examples of suitable end effectors 1310 include drill chucks such as those manufactured by Jacobs Chuck Manufacturing Company of Clemson, S.C., quick change chucks and bit holders similar to those described in U.S. Pat. No. 8,602,411 and found on products such as a DEWALT® DC815KA and DC825KA impact drivers manufactured and marketed by the DeWalt Industrial Tool Company of Baltimore, Md., and collets such as those typically found on rotary saws and routers. In one embodiment, the end effector 1310 is configured to accept bits having a ¼" hex shank and a radial groove adapted and configured to receive one or more ball bearings within the end effector 1310 to secure the bit against both rotational and axial forces.

Bit can have various geometries (e.g., spiral/helical-shaped cutting edges), materials, coatings, and dimensions so as to cut through different materials such as tile, stone, wall (e.g., drywall, plasterboard/blueboard), plaster and wooden lath, cementitious backer board, and the like), wood (e.g., dimensional lumber, plywood, oriented strand board (OSB), and the like), laminates, plastic, vinyl, fiberglass, metals (e.g., aluminum siding, steel, and the like), cementitious siding, and the like.

Figure 15:
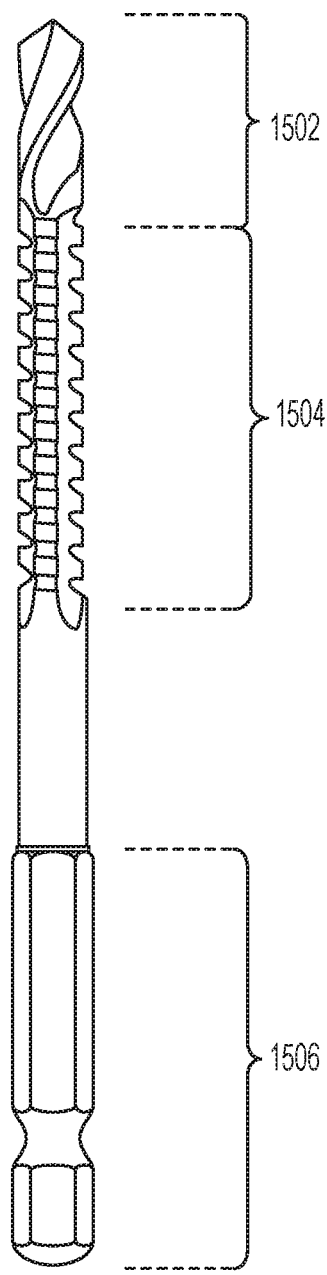
FIG. 15 depicts a bit according to an embodiment of the invention.

One example of a particularly advantageous bit is depicted in FIG. 15 and includes a leading twist drill portion 1502, a studded reaming portion 1504, and a ¼" hex shank 1506. The depicted bit is available under Part No. 728127 from Hitachi Koki U.S.A. Ltd. of Braselton, Ga.

A base plate 1312 can assist the user in maintaining the tool 1300 perpendicular to the work surface and can be adjusted to varying depths through thumb screw 1314 or other mechanisms such as those described in U.S. Pat. No. 7,946,318.

Tool 1300 can be adapted, configured, and/or programmed to move an end effector at a variety of speeds.

For example, tool 1300 can rotate the end effector at a speed between about 5,000 revolutions per minute (RPM) and about 35,000 RPM (e.g., between about 5,000 RPM and about 10,000 RPM, between about 10,000 RPM and about 15,000 RPM, between about 15,000 RPM and about 20,000 RPM, between about 20,000 RPM and about 25,000 RPM, between about 25,000 RPM and about 30,000 RPM, between about 30,000 RPM and about 35,000 RPM, and the like), between about 8,000 RPM and about 30,000 RPM, and the like.

Additionally or alternatively, the tool 1300 can reciprocate at a frequency of between about 800 strokes per minute (SPM) and about 3,100 SPM (e.g., between about 800 SPM and about 900 SPM, between about 900 SPM and about 1,000 SPM, between about 1,000 SPM and about 1,500 SPM, between about 1,500 SPM and about 2,000 SPM, between about 2,000 SPM and about 2,500 SPM, between about 2,500 SPM and about 3,000 SPM, between about 3,000 SPM and about 3,100 SPM, and the like).

Reciprocating length can be adjusted to various lengths (e.g., between about ½" and about 1").

EQUIVALENTS

The functions of several elements may, in alternative embodiments, be carried out by fewer elements, or a single element. Similarly, in some embodiments, any functional element may perform fewer, or different, operations than those described with respect to the illustrated embodiment.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

INCORPORATION BY REFERENCE

The entire contents of all patents, published patent applications, and other references cited herein are hereby expressly incorporated herein in their entireties by reference.

The invention claimed is:

1. A multi-mode drive mechanism comprising:
an input shaft terminating in an input external spur gear;
a reciprocating assembly comprising:
a reciprocating hub positioned coaxially over, but not fixed to, the input shaft and adjacent to the input external spur gear, the reciprocating hub including a hub external spur gear; and
a reciprocating shaft adapted and configured to transmit reciprocating force;
an output shaft positioned coaxially in line with the input shaft, the output shaft having a first end terminating in an output external spur gear positioned adjacent to the input external spur gear;
a reciprocating block sitting over the output shaft, coupled directly or indirectly to the reciprocating shaft, and adapted and configured to:
reciprocate the output shaft axially when force is received from the reciprocating shaft; and
permit rotation of the output shaft; and
a shift collar having an internal spur gear complementary to the input external spur gear, the output external spur gear, and the hub external spur gear, the shift collar slidably positioned over the input external spur gear and adapted and configured to slide between:
a first position in which the shift collar engages with the input external spur gear and the output external spur gear to rotate, but not reciprocate, the output shaft;
a second position in which the shift collar engages with the input external spur gear, the output external gear, and the hub external gear spur to both rotate and reciprocate the output shaft; and
a third position in which the shift collar engages with the input external gear and the hub external gear spur to reciprocate, but not rotate, the output shaft.

2. The multi-mode drive mechanism of claim 1, wherein the reciprocating assembly further comprises:
a cylindrical cam positioned coaxially over the input shaft and rotationally coupled to the reciprocating hub; and
a follower including one or more dowel pins adapted and configured to travel along grooves in the cylindrical cam to translate rotation of the cylindrical cam into reciprocating linear force.

3. The rotary and reciprocating tool of claim 1, wherein the reciprocating assembly further comprises a crank rotationally coupled to the reciprocating hub.

4. The rotary and reciprocating tool of claim 1, further comprising:
a lever coupled to the shift collar and adapted and configured to move advance the shift collar between the first position, the second position, and the third position.

5. The rotary and reciprocating tool of claim 1, wherein the reciprocating shaft is indirectly coupled to the reciprocating block via a stroke depth adjustment mechanism.

6. The rotary and reciprocating tool of claim 5, wherein the stroke depth adjustment mechanism comprises:
a stroke control lever rotatable about a fixed pivot point, the stroke control lever defining a first slot;
a stroke adjuster rotatably fixed at a first end and rotatably coupled to the reciprocating shaft at a second end, the stroke adjuster defining a second slot; and
a slave link rotatably coupled to the reciprocating block at a first end, the slave link having a pin at the second end, the pin lying within both the first slot of the stroke control lever and the second slot of the stroke adjuster, such that rotation of the stroke control lever moves the pin within the second slot of the stroke adjuster and adjusts a length of a reciprocating stroke applied to the slave link.

7. The rotary and reciprocating tool of claim 1, further comprising:
a first synchronization ring adjacent to a first end of the shift collar; and a second synchronization ring adjacent to a second end of the shift collar.

8. The rotary and reciprocating tool of claim 1, further comprising:
a reduction gearing assembly coupled to the reciprocating hub.

9. The rotary and reciprocating tool of claim 8, wherein the reduction gearing assembly is a planetary gearing.

10. The rotary and reciprocating tool of claim 8, wherein the output shaft further comprises a slip joint between adapted and configured to accommodate reciprocation and rotation of the output shaft.

11. A rotary and reciprocating tool comprising:
an input shaft terminating in an input external spur gear;
a reciprocating assembly comprising:
a reciprocating hub positioned coaxially over the input shaft and adjacent to the input external spur gear, the reciprocating hub including a hub external spur gear;
a planetary reduction gearing assembly including a stationary ring gear, a central sun gear, and a plurality of planet gears between the stationary ring gear and central sun gear, the sun gear coupled to the reciprocating hub;
a cylindrical cam positioned coaxially over the input shaft and coupled to the planet gears of the planetary reduction gearing assembly;
a follower including one or more dowels adapted and configured to travel along grooves in the cylindrical cam to translate rotation of the cylindrical cam into linear force; and
a reciprocating shaft adapted and configured to transmit reciprocating force;
an output shaft positioned coaxially in line with the input shaft, the output shaft having a first end terminating in an output external spur gear positioned adjacent to the input external spur gear and a second end terminating in a chuck;
a reciprocating block sitting over the output shaft and adapted and configured to:
reciprocate the output shaft axially when force is received; and
permit rotation of the output shaft;
a stroke depth adjustment mechanism comprising:
a stroke control lever rotatable about a fixed pivot point, the stroke control lever defining a first slot;
a stroke adjuster rotatably fixed at a first end and rotatably coupled to the reciprocating shaft at a second end, the stroke adjuster defining a second slot; and
a slave link rotatably coupled to the reciprocating block at a first end, the slave link having a pin at the second end, the pin lying within both the first slot of the stroke control lever and the second slot of the stroke adjuster, such that rotation of the stroke control lever moves the pin within the second slot of the stroke adjuster and adjusts a length of a reciprocating stroke applied to the slave link;
a shift collar having an internal spur gear complementary to the input external spur gear, the output external spur gear, and the hub external spur gear, the shift collar slidably positioned over the input external spur gear and adapted and configured to slide between:

a first position in which the shift collar engages with the input external spur gear and the output external spur gear to rotate the output shaft;
a second position in which the shift collar engages with the input external spur gear, the output external gear, and the hub external gear spur to rotate and reciprocate the output shaft; and
a third position in which the shift collar engages with the input external gear and the hub external gear spur to reciprocate the output shaft;
a first synchronization ring adjacent to a first end of the shift collar;
a second synchronization ring adjacent to a second end of the shift collar; and
a housing.

12. The rotary and reciprocating tool of claim 11, further comprising:
a shift lever having:
a fixed first end mounted at a fulcrum point;
a user-movable second end; and
a pin mounted between the fixed first end and the user-movable second end, the pin engaged with shift collar such that movement of the shift lever causes movement of the shift lever.

13. The rotary and reciprocating tool of claim 12, wherein the housing comprises:
a slot from which the shift lever extends.

14. The rotary and reciprocating tool of claim 13, wherein the housing further comprises:
three detents along the slot, each of the detents corresponding to one of the first position, the second position, and the third position.

15. The rotary and reciprocating tool of claim 11, further comprising:
a nut rotatably coupled to the stroke control lever;
a threaded rod received within the nut; and
a stroke control adjustment knob external to the housing and coupled to the threaded rod such that rotation of the stroke control adjustment knob moves the stroke control lever.

16. The rotary and reciprocating tool of claim 11, further comprising:
a base plate adapted and configured to hold the rotary and reciprocating tool at a defined distance from a surface.

17. The rotary and reciprocating tool of claim 16, wherein the end effector is a tool-less bit holder.

18. The rotary and reciprocating tool of claim 17, wherein the rotary power source is an electric motor.

19. The rotary and reciprocating tool of claim 17, wherein the rotary power source is selected from the group consisting of: a pneumatic motor, an hydraulic motor, and a combustion engine.

20. The rotary and reciprocating tool of claim 11, further comprising:
an end effector coupled to the output shaft.

21. The rotary and reciprocating tool of claim 11, further comprising:
a rotary power source coupled to or adapted and configured for coupling to the input shaft.

* * * * *